Figure 1:
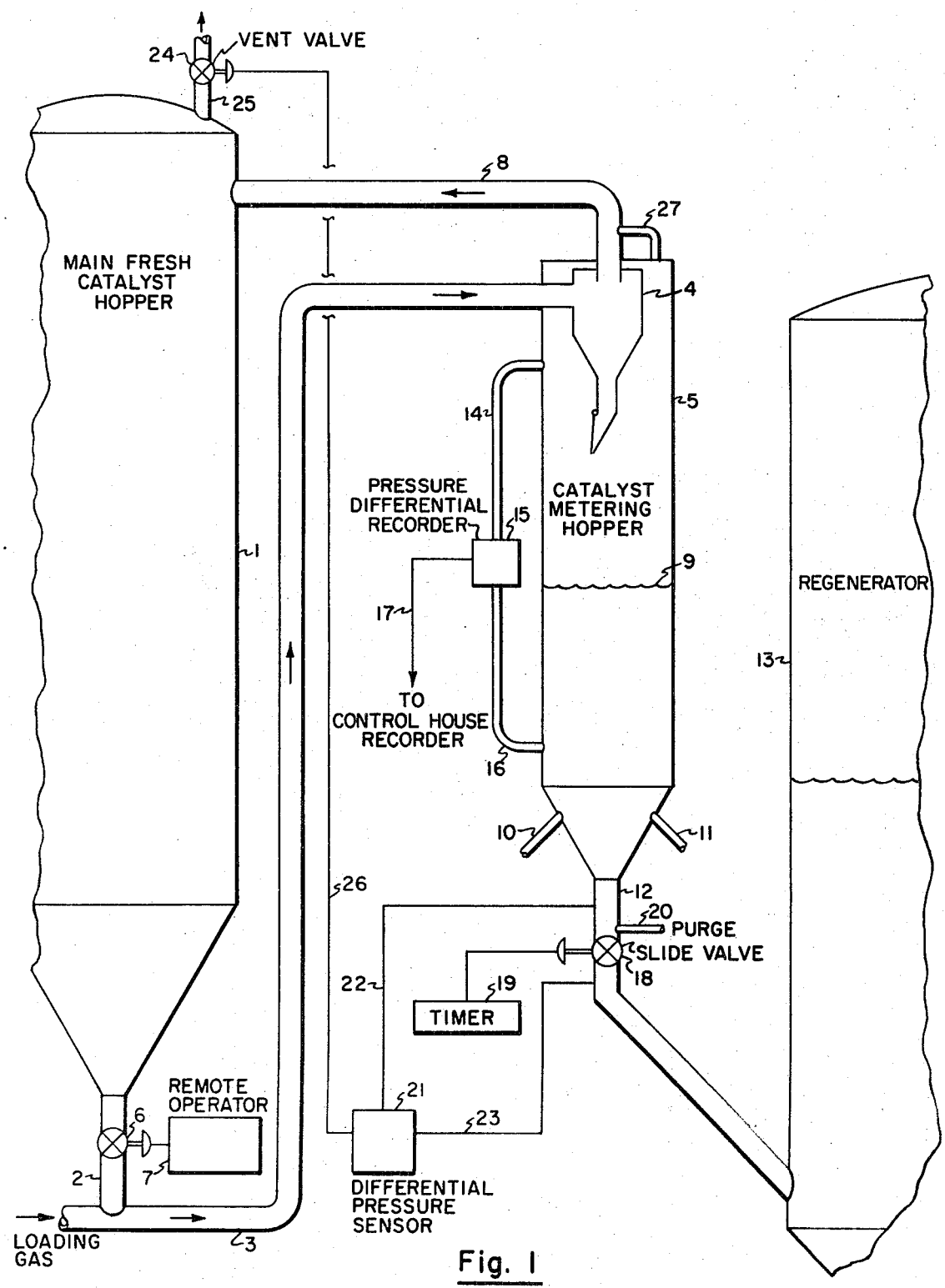

United States Patent [19]
Luckenbach

[11] 3,850,582
[45] Nov. 26, 1974

[54] APPARATUS FOR CONTROLLED ADDITION OF FLUIDIZED PARTICLES TO A PROCESSING UNIT

[75] Inventor: Edward C. Luckenbach, Mountainside, N.J.

[73] Assignee: Exxon Research and Engineering Company, Linden, N.J.

[22] Filed: Jan. 10, 1973

[21] Appl. No.: 322,440

Related U.S. Application Data
[63] Continuation-in-part of Ser. No. 883,815, Dec. 10, 1969, abandoned.

[52] U.S. Cl............ 23/288 S, 23/288 C, 23/288 E, 208/152, 208/164, 208/DIG. 1
[51] Int. Cl............................ B01j 9/16, B01j 9/20
[58] Field of Search............... 208/DIG. 1, 164, 152; 23/288 S; 288 E, 288 C, 253 A; 302/53, 54; 214/17 C, 17 CA

[56] References Cited
UNITED STATES PATENTS

| | | | |
|---|---|---|---|
| 2,601,676 | 6/1952 | Trainer et al.................. | 23/288 S X |
| 2,892,773 | 6/1959 | Hirsch et al................... | 23/288 S X |
| 3,206,393 | 9/1965 | Pohlenz............................ | 208/164 |
| 3,353,925 | 11/1967 | Baumann et al................. | 23/288 E |

*Primary Examiner*—Joseph Scovronek
*Attorney, Agent, or Firm*—Roy J. Ott

[57] ABSTRACT

A system for continuously or periodically adding a finely divided catalyst to a fluid catalytic processing unit wherein a metering pipe within a main storage vessel is arranged to receive fresh make-up catalyst therefrom. The catalyst in the metering pipe is fluidized and then measured by means of a differential pressure control recorder for transfer to the processing unit.

9 Claims, 2 Drawing Figures

E.C. Luckenbach INVENTOR

APPARATUS FOR CONTROLLED ADDITION OF FLUIDIZED PARTICLES TO A PROCESSING UNIT

CROSS-REFERENCES TO RELATED APPLICATIONS

This application is a continuation-in-part of copending application Ser. No. 883,815, filed Dec. 10, 1969, now abandoned.

BACKGROUND OF THE INVENTION

1. Field of the Invention

This invention relates to a system for metering the quantity of catalyst added to a processing unit. More particularly, the present invention is concerned with the addition of fresh, make-up catalyst particles to a fluidized catalytic cracking process unit.

2. Description of the Prior Art

There is a need for a more precise system for the addition of finely divided solids to processing units. In particular, a precise system is required for adding fresh catalyst to fluid catalytic cracking units.

The present systems of catalyst addition are essentially batch systems with addition periods extending from a few minutes to several hours. These systems require considerable operator attention. In a typical operation, catalyst is loaded into a large storage vessel from a hopper car. The catalyst slumps into the storage vessel and forms an irregular surface at the top. When loading is completed, the operator lowers a measuring line into the vessel to determine the height of catalyst mass. The catalyst holdup is then calculated assuming a density of the settled catalyst. Since the top of the catalyst bed is not level and the catalyst packs differently at various levels, the calculated quantity of catalyst usually is not presise. Thus, the catalyst addition rates and the quantity of catalyst added are not accurately known on a day-to-day basis.

The quantity of fresh catalyst added daily to replace withdrawn spent catalyst for the purpose of maintaining activity level amounts to 0.5 to 4.0 percent of the catalyst inventory of the cracking unit. For a 50,000 B/D catalytic cracking unit, the fresh catalyst addition rate will normally average between 3 and 6 tons per day. It will be appreciated that if a large batch of fresh catalyst is added to an operating cracking unit in a short period of time the processing balance of the unit is upset — at least temporarily.

SUMMARY OF THE INVENTION

In brief summary, the present invention provides a means of feeding fresh catalyst from a limited inventory aerated catalyst metering hopper through a cycle timed valve located between the hopper and the point at which the fresh catalyst is fed into the cracking system, e.g., the catalyst regenerator. A differential pressure indicator measures the pressure differential from the bottom to the top of the hopper and this Δ P can be converted into the weight of catalyst in the hopper, i.e., the catalyst holdup by applying the formula:

wt. of catalyst (lb.) = $\Delta P$(psi) × area of hopper (in.$^2$)

The pressure differential can be transmitted to a strip chart recorder for a continuous accurate record of the weight of catalyst added to the cracking unit. A cycle timer is preset to open and close a valve which supplies small quantities of fresh catalyst at frequent intervals from the hopper to the unit. A positive pressure is maintained in the hopper by means of a differential pressure sensor operatively connected to a suitably located vent valve. In this manner a suitable pressure drop is maintained between the upstream and downstream sides of the fresh catalyst supply valve. In a preferred embodiment a remote operated valve is opened and closed at desired intervals to transfer fresh catalyst from the main fresh catalyst hopper to the catalyst metering hopper.

Figure 2:
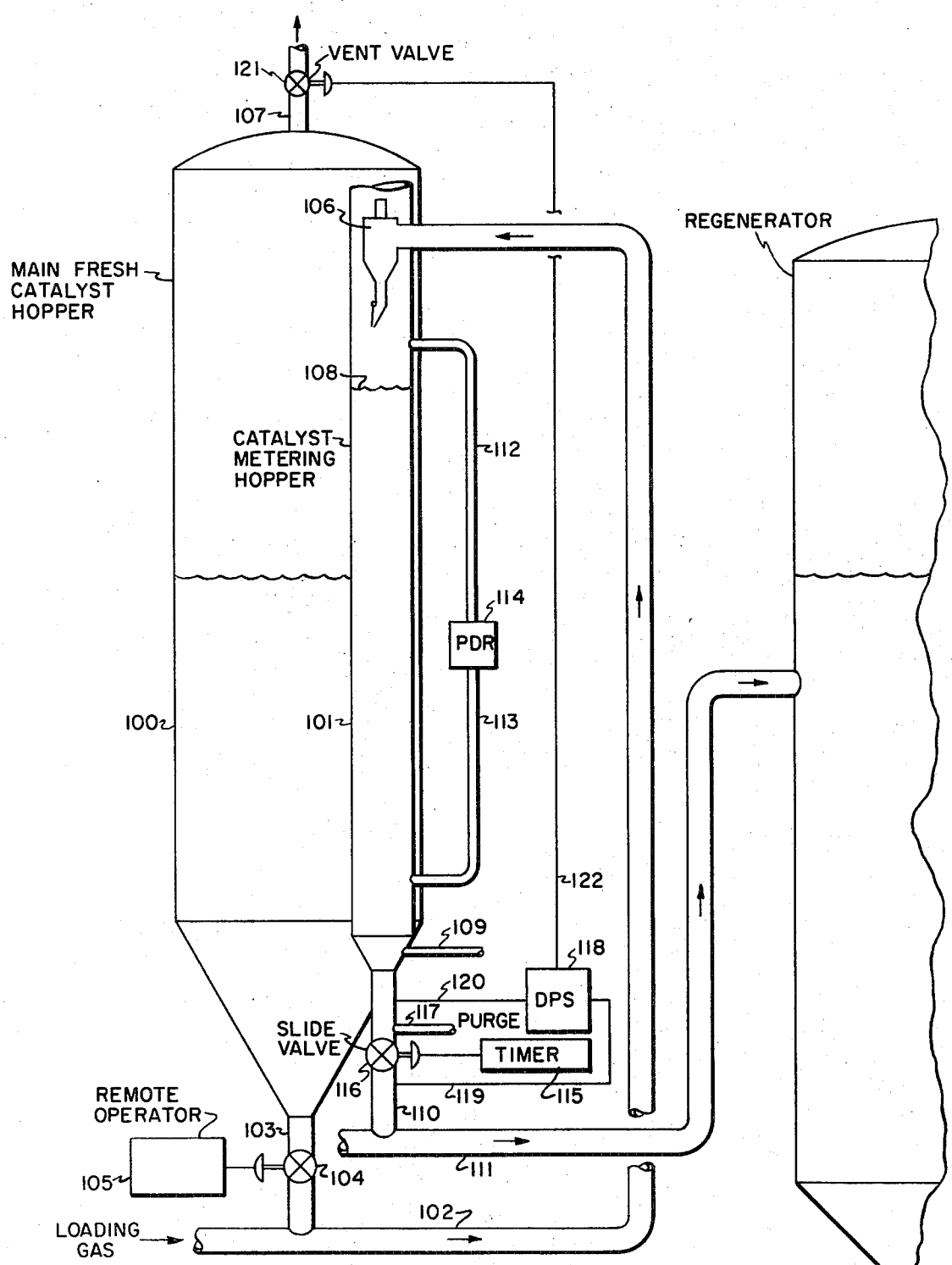

In the drawings FIG. 1 is a front elevation of a system for feeding fresh active catalyst to a cracking unit wherein the catalyst metering hopper is a separate vessel and FIG. 2 is a similar view of a system in which the catalyst metering hopper is located within the main fresh catalyst hopper.

Referring to FIG. 1, reference numeral 1 designates a partial section of a vertical cylindrical main fresh catalyst hopper. The main hopper will have sufficient capacity to hold several weeks supply of fluidizable cracking catalyst, i.e., 150 to 200 tons for a 50,000 B/D unit. Fluid catalyst for catalytic cracking is generally a finely divided synthetic aluminosilicate or treated natural clay and the newer catalysts contain crystalline aluminosilicate zeolite materials. The catalyst has an average size range of 10–100 microns. The hopper swedges down to connect with a line 2 which terminates in line 3. Loading gas fed to line 3 from a suitable source is employed to carry the fresh catalyst into a cyclone 4 located in the upper section of the catalyst metering hopper 5. The quantity of catalyst transferred is controlled by valve 6 which is actuated by a remote operator 7. Sufficient catalyst will be fed into hopper 5 to supply fresh make-up catalyst for a short period such as 0.5 to 1 day. Loading gas separated from the catalyst in cyclone 4 is passed by line 8 to the main hopper for removal from the system by any suitable means.

Catalyst separated in cyclone 4 drops into the metering hopper and the upper level of the catalyst in the hopper is designated by reference numeral 9. The bed of catalyst is maintained in a fluidized state by fluidizing gas fed to the hopper by lines 10 and 11. Any suitable number of fluidizing gas lines can be spaced around the lower portion of hopper 5. Alternatively, a gas distribution ring can be placed in the hopper to provide an even flow of fluidizing gas. Fresh catalyst is removed from the hopper by line 12 for transfer to regenerator 13. The exact point of addition of the fresh catalyst to the cracking system is optional and addition to the regenerator is merely a preferred mode of operation.

The size and shape of the catalyst metering hopper is an important aspect of the invention. Hopper 5 is of relatively small cross-section and it is relatively long. The length to diameter ratio will be in the range of 4–1 to 25–1 and the hopper will have a capacity of 3 to 10 tons of catalyst for a 50,000 B/D unit. Thus it will be about 35 feet long and 3 feet in diameter for a 3 ton load and 60 feet long and 4 feet in diameter for a 10 ton charge.

Larger catalyst metering hoppers are impractical because they require larger amounts of gas for aeration and reliable measurement of holdup by a differential pressure intrument. Complex and costly aeration distributors would be required at the bottom of the large vessel to insure good gas distribution. In addition, the accuracy of measurement for a given pressure drop will be correspondingly less in large hoppers.

Line 14 transmits the pressure in the dilute phase of the metering hopper to pressure differential recorder (PDR) 15 and line 16 transmits the pressure in the dense phase of the metering hopper to PDR 15. The line delineating the two phases is reference numeral 9, representing the upper surface of dense phase of fresh catalyst.

The PDR will thus measure the pressure differential across the fluidized bed of catalyst in the metering hopper. The number of pounds of holdup of catalyst in the hopper will be equal to a direct multiplication of the pressure drop in pounds per square inch measured by the PDR and the cross-sectional area of the hopper measured in square inches. Since the hopper is of constant cross-sectional area, the PDR meter can be calibrated to read catalyst holdup directly.

The reading of the PDR in terms of pressure differential or in terms of catalyst holdup can be continuously transmitted by line 17 to a control house recording unit.

Catalyst is caused to flow to the cracking unit by the operation of valve 18. The valve is preferably a slide valve and it is activated by a cycle timer 19. Devices of this type are commercially available, e.g., Model 40 operation schedule timer — Foxboro Instrument Co. The timer is independently set to control the length of time valve 18 is open and the period of time between openings. A line 20 located just above the valve is used to supply purge gas to line 12, whereby packing and plugging are prevented when valve 18 opens and closes. It is necessary to have a pressure drop across valve 18 to cause a unidirectional flow of fresh catalyst from metering hopper 5 to regenerator 13. For this purpose a differential pressure sensor 21 is employed. Upstream pressure is transmitted to the sensor by line 22. Downstream pressure is transmitted to the sensor by line 23. Pressure corrections are made by opening and closing vent valve 24 in line 25, which is operatively connected to sensor 21 by line 26. This line 26 can be an electrical line, an air line or any other suitable type of transmitting means. The $\Delta$ P across valve 18 is maintained at a figure high enough to move the catalyst at a reasonable rate but low enough to minimize erosion of the valve surfaces. In the typical cracking unit the $\Delta$ P will be in the range of 2 to 5 psig. Line 27 connects metering hopper 5 with line 8 and with the main hopper 1. Thus, the pressure in the main fresh catalyst hopper is the same. This pressure will usually be in the range of 8 to 15 psig greater than the regenerator pressure which can range from 5 to 30 psig, depending upon the type of configuration of the fluid catalytic cracking unit.

The operation of the controlled fluid solids addition process and apparatus is hereinafter described in detail. The main fresh catalyst hopper is filled by any suitable means (not shown). Remote operator 7 is actuated to open valve 6 permitting fresh catalyst to pass into line 3. The catalyst is mixed with loading gas in line 3 and passed at a rate of 40 to 100 tons per hour to cyclone 4. Separated loading gas leaves the cyclone by line 8 and the catalyst drops into the hopper 5. Assuming 5 tons of catalyst are to be replaced in the cracking unit each day, the cycle timer is set to open slide valve 18 twelve times in each 1 hour period for times of 0.2 to 2 minutes. The pressure differential recorder transmits readings to the control house that are presented on a strip chart. The chart will accurately show that a certain quantity of catalyst has been fed to the cracking unit and the steepness of slope in the chart record will be an indication of the rate at which the catalyst has been charged. The vent valve maintains sufficient back pressure on the system to assure a $\Delta$ P of 2 to 5 psi across valve 18. As the addition of catalyst progresses, the level of catalyst in metering hopper 5 will drop, decreasing the pressure drop across the valve, if the fresh catalyst hopper is held constant, and the catalyst flow through the valve will decrease. To keep constant flow the pressure in the fresh hopper will be increased so that the pressure drop across the valve 18 is always constant. This will be done by the throttling valve 24 on the vent gas from the fresh catalyst hopper.

Referring to FIG. 2, reference numeral 100 designates a large vertical cylindrical, e.g. internal diameter of 16 feet, main fresh catalyst hopper. The catalyst metering hopper 101 is located within the main hopper. In the embodiment shown in FIG. 2, metering hopper 101 is essentially a vertical standpipe having an internal diameter of about 3 feet. The main hopper has sufficient capacity to hold several days, usually up to 30 days, supply of fluid cracking catalyst and the metering hopper will have a capacity adequate to supply make-up catalyst for a period of from about 8–24 hours. Loading gas fed to line 102 is employed to carry the fresh catalyst from the main hopper into the metering hopper. The quantity of catalyst transferred via line 103 through valve 104 to line 102 is controlled by valve 104 which is opened and closed by remote operator 105. Loading gas separated from the catalyst in cyclone 106 is passed from the system by line 107. Catalyst separated in the cyclone drops into the metering hopper and the upper level of catalyst in the hopper is designated by reference numeral 108. Catalyst in the standpipe 101 is fluidized by a fluidizing gas such as air, nitrogen or $CO_2$ fed at a superficial velocity of about 0.2 ft./second into the standpipe by one or more gas lines shown generally by reference numeral 109. Fresh catalyst is removed from the standpipe by lines 110 and 111. The exact point of addition of the fresh catalyst is optional depending upon the amount of preconditioning and heating required. The standpipe will have a length to diameter ratio of 5/1 to 25/1. For efficient operation, it is preferred that the main storage vessel be substantially larger than the metering vessel. Preferably, the main storage vessel will hold at least 25 times the volume of catalyst held in the metering vessel. Usually the vessels will be cylindrical with the metering vessel being an internal pipe substantially the same height as the main vessel. In such a case the internal diameter of the main vessel will be preferably five to eight times greater than the internal diameter of the metering pipe.

Lines 112 and 113 transmit pressures in the upper and lower areas of the standpipe to pressure differential recorder (PDR) 114. The PDR provides an accurate continuous indication of catalyst holdup as described previously with respect to FIG. 1. Cycle timer 115 operates slide valve 116, as discussed, causing precise amounts of fresh catalyst to flow to the unit at the desired time intervals. Purge gas from line 117 prevents packing and bridging in line 110 above valve 116. The pressure drop across valve 116 is measured by sensor 118 from the input of lines 119 and 120. Pressure corrections are made by opening and closing vent valve 121 which is operatively connected to sensor 118 by line 122.

The essential difference between the apparatus of FIG. 1 and FIG. 2 is in the location of the catalyst metering hopper. However, the latter has many advantages. For example, having the metering hopper inside the main hopper significantly reduces cost since the metering vessel or pipe does not have to be a pressure vessel, i.e. it can be open ended. In addition, the internal metering vessel or pipe need not have its own safety valves and/or a separate foundation.

Fluidization of only the catalyst in the metering vessel is also advantageous. Thus, it would require large amounts of air to fluidize the catalyst in the main storage vessel leading to the use of excessive horsepower and an expensive grid or pipe distributor to evenly distribute the gas for fluidization.

While a specific apparatus and method of controlled catalyst addition have been described, it is to be understood that the invention is not to be restricted thereto and modifications can be made without departing from the spirit of the invention.

What is claimed is:

1. An apparatus for adding fresh make-up catalyst to a process unit which comprises:
   a. a main fresh catalyst vessel containing solid fresh make-up catalyst particles;
   b. a metering vessel located within the main vessel
   c. a catalyst transfer line connecting the main catalyst vessel with the metering vessel for transfer of fresh make-up catalyst from the main vessel to the metering vessel;
   d. a gas line communicating with said metering vessel for fluidizing the catalyst therein;
   e. valve means for controlling withdrawal of fluidized catalyst from said metering vessel for transfer to said process unit; and
   f. means for measuring and recording the pressure differential across the fluidized bed of catalyst in the metering vessel so that the quantity of fresh catalyst added to the process unit may be determined during any period of time.

2. The apparatus of claim 1 comprising differential pressure sensing means communicating with the upstream side and the downstream side of said valve means adapted to continuously measure the pressure drop across the valve and means to adjust the pressure on the upstream side of said valve to maintain the pressure drop across said valve within a predetermined range.

3. The apparatus of claim 2 wherein said metering vessel is an elongated cylindrical vessel having an open upper end.

4. The apparatus of claim 3 wherein the pressure adjustment means is associated with the main vessel and comprises a vent line containing a vent valve, said vent valve being operated by said differential pressure sensing means.

5. The apparatus of claim 4 comprising a cycle timer operatively connected to said valve means and adapted to open and close said valve at preset time intervals.

6. The apparatus of claim 5 wherein said main vessel is cylindrical and has an inner diameter at least five times greater than the inner diameter of said metering vessel.

7. An apparatus for adding fresh make-up catalyst to the regenerator of a fluid catalytic cracking process unit which comprises:
   a. a main catalyst vessel containing non-fluidized solid fresh catalyst particles;
   b. an elongated cylindrical metering vessel located within the main vessel and occupying less than 5 volume percent thereof;
   c. a catalyst transfer line connecting the lower section of the main catalyst vessel with the upper section of the metering vessel;
   d. means for supplying loading gas to the catalyst transfer line for carrying the fresh catalyst from the main vessel into the metering vessel;
   e. a gas line communicating with said metering vessel for fluidizing the catalyst therein;
   f. valve means for controlling withdrawal of fluidized catalyst from said metering vessel;
   g. differential pressure sensing means for measuring the pressure drop across said valve means;
   h. means to adjust the pressure on the upstream side of said valve means to maintain the pressure drop across the valve within a predetermined range;
   i. a cycle timer operatively connected to said valve means and adapted to open and close said valve at preset time intervals;
   j. conduit means for transferring fresh catalyst from the metering vessel into the regenerator; and
   k. a differential pressure control recorder communicating with the upper and lower sections of said metering vessel and adapted to measure and record the pressure drop across the metering vessel so that the quantity of fresh catalyst added to the regenerator can be determined.

8. The apparatus of claim 7 wherein said metering vessel is a vertical pipe having an open upper end.

9. The apparatus of claim 8 wherein said pressure adjustment means is associated with the main vessel and comprises a vent line containing a vent valve operated by said differential pressure sensing means.

* * * * *